United States Patent [19]
Stephens

[11] Patent Number: 5,265,897
[45] Date of Patent: Nov. 30, 1993

[54] SKEWER FOR AUTOMOBILE BICYCLE RACKS

[76] Inventor: Charles W. Stephens, 1296 Adair St., San Marino, Calif. 91108

[21] Appl. No.: 883,861

[22] Filed: May 15, 1992

[51] Int. Cl.$^5$ .............................................. B62H 3/00
[52] U.S. Cl. .................................. 280/293; 280/279; 211/17; 211/22
[58] Field of Search ............... 280/293, 295, 279, 288; 211/17, 20, 22

[56] References Cited

U.S. PATENT DOCUMENTS

| | | | |
|---|---|---|---|
| 4,033,627 | 7/1977 | Morroni | 280/279 |
| 4,103,922 | 8/1978 | Brilando | 280/279 |
| 4,711,459 | 12/1987 | Liu | 280/279 |
| 4,805,941 | 2/1989 | Downing et al. | 280/279 |
| 4,934,572 | 6/1990 | Bowman et al. | 211/17 |
| 5,118,125 | 6/1992 | Plunkett | 280/279 |

*Primary Examiner*—Margaret A. Focarino
*Assistant Examiner*—Florian Zeender
*Attorney, Agent, or Firm*—Donald D. Mon

[57] ABSTRACT

A skewer assembly for holding the front fork of a bicycle. The fork has a pair of clevises each with a pair of arms. A skewer housing body has a pair of end faces extending around opposite ends of a passage which extends between them. A skewer rod adjustment and clamp act to hold the clevises against the end faces. The diameter of the skewer rod is substantially equal to the spacing between the clevis arm so the rod can fit closely over the rod.

3 Claims, 2 Drawing Sheets

SKEWER FOR AUTOMOBILE BICYCLE RACKS

FIELD OF THE INVENTION

This invention relates to a skewer for automobile bicycle racks.

BACKGROUND OF THE INVENTION

One widely used type of device for mounting a bicycle to an automobile is a skewer assembly fixed to the vehicle's roof. The front wheel is removed from the bicycle, and the front fork is held to the device by passing a skewer rod through the fork where the hub was removed, and tightening the skewer against the fork, acting as a clamp.

Initially, the skewer assemblies were essentially identical to those used on a conventional quick release hub. Protrusions on the skewer housing simulated the hollow axle of the bicycle hub, and these protrusions were of the same diameter and wall thickness as the bicycle's hollow axles.

In experience, especially on roof racks, the skewer rods were often bent in use, especially when installing or removing the bicycle from the rack. There followed a development, which is now common practice, to increase the diameter of the hole in the housing, and to increase the diameter of the rod. However, this reduces the wall thickness of the skewer housing protrusions to a barely acceptable minimum dimension. Still, bending of the skewer rods remains a major problem, and with known housing constructions, further increase in rod diameter cannot be provided.

It is an object of this invention to provide a skewer housing and skewer rod in which the diameter of the skewer rod can be enlarged enough so as substantially to eliminate the risk of bending the rod.

The above and other features of this invention will be fully understood from the following detailed description and the accompanying drawings, in which:

DETAILED DESCRIPTION OF THE INVENTION

Figure 1:
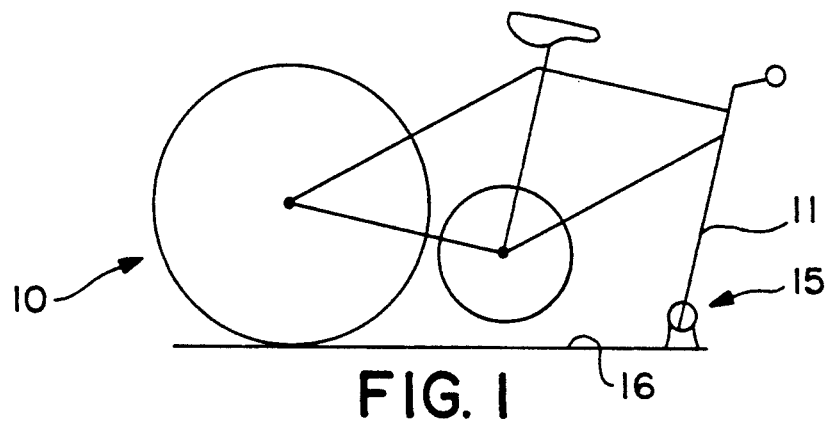
FIG. 1 is a schematic side elevation showing the front fork of a bicycle mounted to a skewer assembly.

FIG. 1 shows a bicycle 10 with its front wheel removed There remains a conventional front fork 11, which is to be mounted to a skewer assembly 15. The skewer assembly itself will somehow be attached to the roof 16 or some other part of the auto, or to other means which are so attached.

Figure 2:
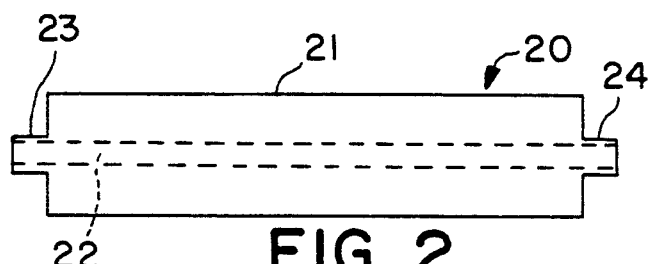
FIG. 2 is a side view of a prior art skewer housing.

A prior art skewer housing 20 is shown in FIGS. 2 and 8. It has a generally tubular body 21 with a passage 22 therethrough. Protrusion 23 and 24 of reduced inside diameter extend from the ends of the housing. The passage enters through these protrusions.

Figure 3:
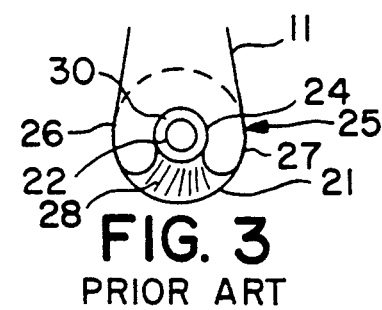
FIG. 3 shows the clevice of a front fork of a bicycle mounted to the housing of FIG. 2.
Figure 4:
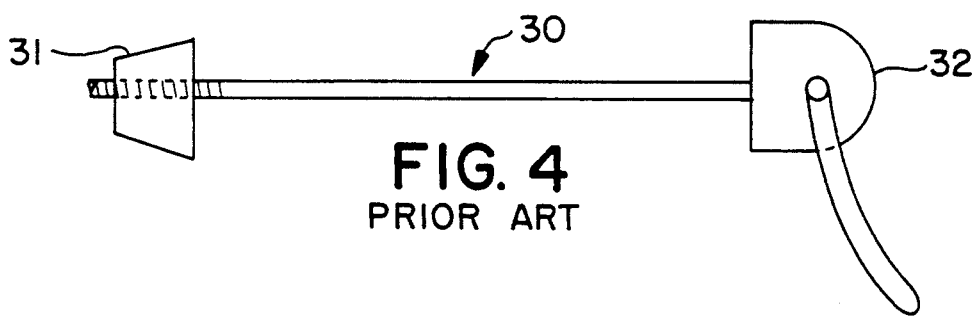
FIG. 4 is a side view of a prior art skewer rod.

As can be seen in FIG. 3, the front clevises 15 of the fork arms fit over the protrusions when the bicycle is mounted. Each clevis has two arms 26, 27, which are spaced apart by a spacing 28. To hold the fork to the housing, a skewer rod 80 is passed through the passage. An adjustment nut 31 is threaded to one end of the rod, and a cam 52 is attached to the other. To mount the bicycle, the adjustment nut is removed, the rod passed through, and the adjustment nut positioned. Then the cam is tightened down. The nut and the cam press against respective clevises, to press them against the housing, thereby acting as a clamp.

Figure 5:
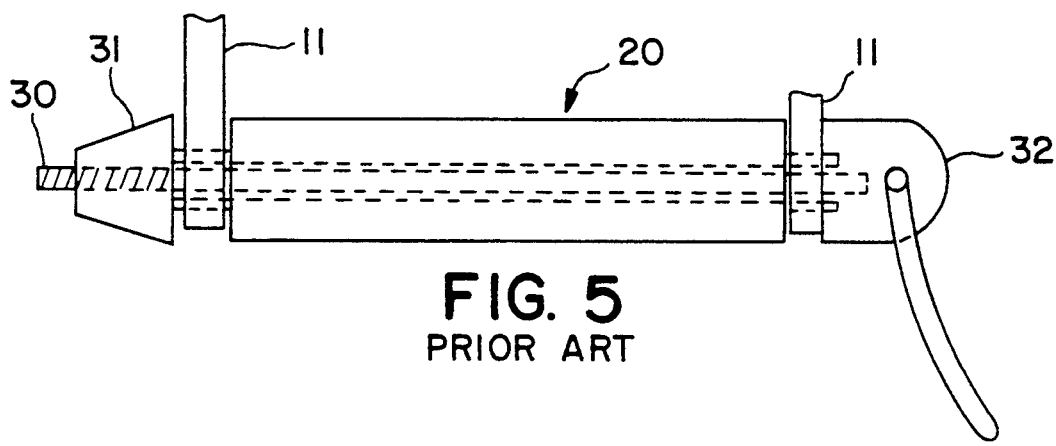
FIG. 5 is a side view of an assembly of a prior art housing and rod, holding a bicycle front fork.
Figure 6:
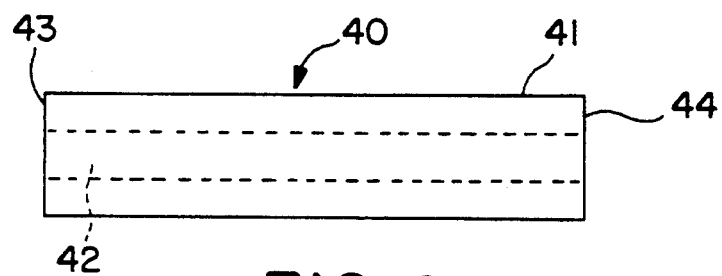
FIG. 6 is a skewer housing according to the invention.
Figure 7:
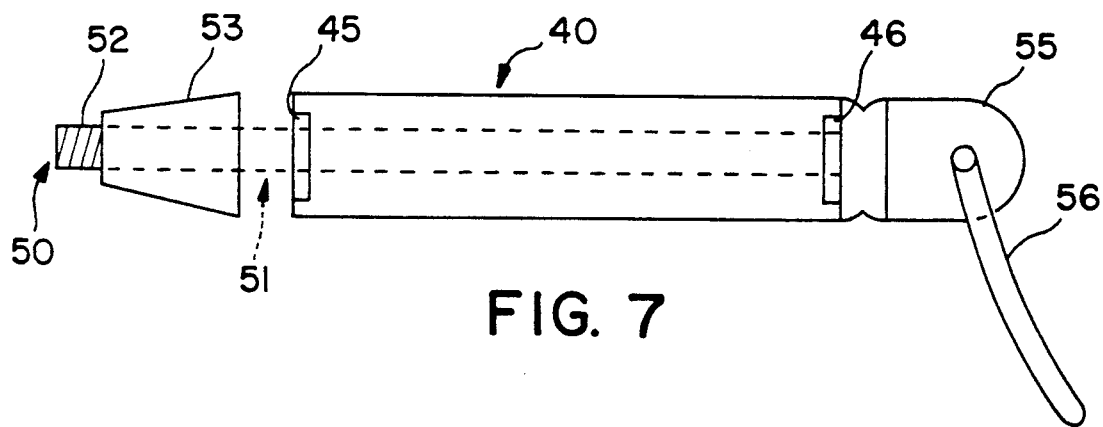
FIG. 7 is a side view of the assembly of a housing and of a rod according to this invention.

It will be appreciated that the total diameter of the rod and protrusions cannot exceed the spacing in the fork clevises. Thus, for the fork to fit on the protrusion, as shown in FIG. 5 a reasonable thickness must be provided for the protrusion. What remains is for the diameter of the rod. There results a situation in which bending of the rod often occurs.

This invention dispenses with the protrusions, and makes available the full spacing of the clevis for the rod. Thus, a rod of maximum bending strength can be provided, and the risk of destroying the protrusions is eliminated, because there are none.

The skewer housing 40 of the invention is a tubular body 41 with a central passage 42 extending axially between its end faces 43, 44. It is intended to be mounted to a vehicle or other structure, which means forms no part of this invention. The end faces extend around the passage, and are preferably annular and planar.

Conveniently but optionally, rubber seals 45, 46 mat be seated in the ends of the body to protect the clevises. These are intended to make a resilient friction (interference) fit with the rod. Then the rod can be centered before the fork is inserted. Also they will prevent rattling when there is not a fork in the assembly.

The skewer rod 60 has a diameter 51 equal to the spacing 28 of the clevises. It has a threaded ®nd 52 to Which an adjustment nut 53 is attached. At the other end it has a conventional cam clamp 55 with an actuating handle 56. This cam clamp is well known in the bicycle trade. Its function is to draw the rod toward itself so as to press itself and the attachment nut against the fork arms, and to press the fork against the housing.

There results a skewer assembly with a rod of maximum bending strength, and without protrusions on the body. The risk of damage to the skewer assembly is greatly reduced.

This invention is not to be limited by the embodiment shown in the drawings and described in the description, which is given by way of example and not of limitation, but only in accordance with the scope of the appended claims.

I claim:

1. A skewer assembly for holding the front fork of a bicycle, said front fork including a pair of clevises, each said clevis having a pair of arms which are spaced apart by a spacing, said skewer assembly comprising:

a skewer housing comprising a body adapted to be attached to a vehicle, said body having a pair of opposite end faces and a passage extending between and entering through said end faces, said end faces extending around said passage where said passage passes through said end faces;

a skewer rod having a first threaded rod end, an adjustment nut threaded to said threaded rod end, a second rod end, and a diameter cam type clamp means on said second rod end adapted to pull the rod so that the adjustment nut approaches the clamp means;

said diameter of said skewer rod being substantially equal to the spacing of said arms whereby said clevises can fit closely over said skewer rod, and said adjustment nut and clamp means can press against a respective clevis, to press the clevises against said end faces, whereby releasably to hold said front fork to said skewer housing.

2. A skewer assembly according to claim 1 in which said end faces of said body are annular.

3. A skewer assembly according to claim 1 in which a resilient seal means abuts said end faces of said body.

* * * * *